Figure 1:
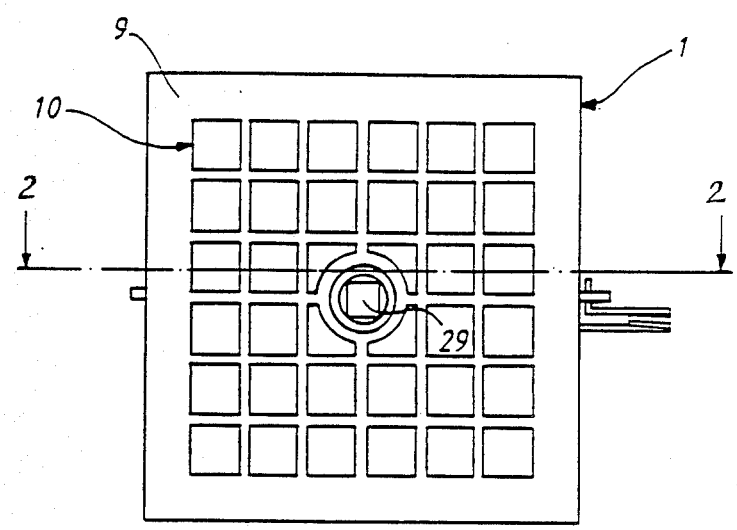

United States Patent [19]

Elfverson

[11] Patent Number: 4,928,582
[45] Date of Patent: May 29, 1990

[54] NOZZLE FOR DISCHARGING VENTILATION AIR FROM A VENTILATION SYSTEM

[75] Inventor: Sven E. Elfverson, Mullsjö, Sweden

[73] Assignee: Saab-Scania Aktiebolag, Sweden

[21] Appl. No.: 339,614

[22] PCT Filed: Sep. 25, 1987

[86] PCT No.: PCT/SE87/00432
§ 371 Date: Mar. 29, 1989
§ 102(e) Date: Mar. 29, 1989

[87] PCT Pub. No.: WO88/02319
PCT Pub. Date: Apr. 7, 1988

[30] Foreign Application Priority Data

Sep. 29, 1986 [SE] Sweden ............... 8604094

[51] Int. Cl.⁵ .................. B60H 1/34; F24F 13/12
[52] U.S. Cl. ............................. 98/2; 98/40.24
[58] Field of Search .............. 98/2, 40.24, 40.27

[56] References Cited

U.S. PATENT DOCUMENTS 3,672,293  6/1972  Gona et al. ............... 98/40.24
4,614,151  9/1986  Elfverson ................... 98/2
4,653,385  3/1987  Ito et al. .................. 98/2 X

FOREIGN PATENT DOCUMENTS 8404498 11/1984 World Int. Prop. O. .

Primary Examiner—Harold Joyce
Attorney, Agent, or Firm—Ostrolenk, Faber, Gerb & Soffen

[57] ABSTRACT

Nozzle for discharging ventilation air from a ventilation system, preferably arranged in a vehicle and including at least one discharge housing with a plurality of parallel plates, which are arranged displaceable relative to each other in the transverse direction under the action of a control lever. The plates are formed with a pattern of holes which in coaction form ventilation ducts through which ventilation air can flow and allow deflection of the ventilation air flow direction in response to a set position of the control lever. An object of the invention is to prevent the parallel plates from turning in relation to each other and about the control lever. This is substantially enabled by the plates (13) being formed with guide members (18, 19) with the aid of which juxtaposed plates (13) coact and solely allow parallel displacement of the plates (13) relative to each other in one direction and in that the guide members (18, 19) between different plates (13) extend in different directions, whereby the setting of the plates (13) can take place by different parallel displacements.

25 Claims, 2 Drawing Sheets

NOZZLE FOR DISCHARGING VENTILATION AIR FROM A VENTILATION SYSTEM

The present invention relates to a nozzle for discharging ventilation air from a ventilation system, preferably arranged in a vehicle, including at least one outlet housing with a through-flow duct for ventilation air, a plate transverse the flow direction and rigidly attached to the outlet housing, and a plurality of plates parallel to said fixed plate, these plates being arranged mutually displaceable in the transverse direction under the action of a control lever, the plates having patterns of holes, which in coaction form ventilation ducts through which the ventilation air can flow and, in response to the setting of the control lever, allow deviation of the flow direction of the ventilation air.

For leading ventilation air from a ventilation system to a room or a separate space, e.g. a vehicle passenger compartment, it is usual to equip the outlets from the ventilation system with outlet nozzles. In a vehicle passenger compartment it is also often usual to arrange a plurality of outlets from the ventilation system, these outlets preferably being placed at the floor, windscreen and fascia. The outlet nozzles in the fascia are in this case usually adjustable so that the ventilation air can be distributed in different directions.

It is previously known to implement such an adjustable outlet nozzle in vehicles in the form of adjustable louvres which are pivotably mounted in a rectangular frame, which is in turn articulately attached to a rigid body or the like. By turning either the louvres and/or the frame, the ventilation air flowing out can be given different directions.

In the known structure mentioned, the necessity of turning the frame by itself and the louvres by themselves is, however, a complicated adjusting procedure for many people. Added to this, the structure contains a large number of parts which require great accuracy in manufacture and assembly to achieve the desired coaction. These conditions result in that such an outlet nozzle is often relatively expensive.

The U.S. Pat. No. 3,672,293 teaches another outlet nozzle which includes a plurality of parallel plates arranged at right angles to the flow direction. These plates are formed as grids, and all the plates have perfection patterns which in coaction form ventilation ducts. The plates are arranged for parallel displacement relative each other with the aid of a control lever passing through a central hole in each plate. For such displacement, the perforations in the plates will also be displaced, the ventilation ducts being given a deflection which allows air to flow in a given direction.

The latter nozzle indeed as obvious advantages in comparison with the nozzle first mentioned but has also so many obvious disadvantages that the nozzle has not been utilized in practice. Thus, the nozzle requires a comparatively large number of parts which makes the structure expensive to produce. Furthermore, setting of the plates is difficult to carry out with the aid of the control lever, since in different positions it causes play relative to the plates and thereby an inaccurate setting.

The plates in the nozzle according to the cited U.S. patent specification No. 3,672,293 are disposed for mutual engagement under the bias of a compression spring axially surrounding the control lever. With such a coaction, the spring strives to set the plates in a position where they are not displaced relative each other, e.g. in a position corresponding to straight through passage of the ventilation air. This means that there is risk for the set oblique ventilation position in the nozzle not being maintained due to the spring striving to maintain a central setting.

Another variation on how a discharge nozzle including a plurality of parallel plates can be arranged is described in the International patent specification with the publication No. WO84/04498. In this case the control lever is formed like a tuning fork which, with longitudinal slots, is adapted to grip a grid cross in each of the displaceable plates. Here the cross comprises two bars crossing each other, of which one has a circular cross sectional shape and the other an oval cross sectional shape. The fork grips around the circular bar in two places while it grips around the oval bar in only one place. Guidance without play of the parallel plates is thus obtained, at least theoretically. In practice, however, there is often a small amount of play between the control lever and the bars of the grid cross, which is caused inter alia by the manufacturing process. This results in that the plates can be turned without control relative each other about the control lever, and this results in that the setting of the plates can not be done accurately. These disadvantages can indeed be reduced by making the control lever greater and allowing it to grip around the grid crosses of the plates at a greater distance from each other. Such increases of the dimensions of the control lever and grid cross are not generally desirable, however, inter alia from the air flow aspect.

The present invention has the object of forming a discharge nozzle which is advantageous from the air flow aspect, and which allows distribution of the ventilation air in a desired direction and which does not allow the parallel plates to move mutually and about the control lever, even though there is a certain amount of play between the plates and the control lever. In addition, an objective with the discharge nozzle is that it shall be simple as well as being cheap in manufacture. This is enabled with an inventive implementation of the nozzle which is substantially characterized in that the plates are formed with guide members, by means of which juxtaposed plates coact and which only permit parallel displacement of the plates relative each other in one direction, and in that the guide members between different plates extend in different directions, whereby the setting of the plates can take place by different parallel displacements and the plates are prevented from turning relative each other.

By inventively arranging guide members between the plates, all relative turning movements between the plates are prevented. Simultaneously, the guide members permit the plates to be adjusted by parallel displacement in different positions for deflecting ventilation air into different directions as required.

In an advantageous embodiment of the invention, the control lever passes through a hole in the respective plate, each hole being formed with three inwardly directed studs engaging in longitudinal grooves in the control lever provided for this purpose. Two of the studs are arranged in mutual, diametrical opposition and have the same cross sectional configuration, which is preferably semi-circular. The third stud is arranged at an angle of 90° to each of the other two studs and has a semi-elliptical cross sectional configuration. The studs on juxtaposed plates coact to form either completely circular or completely elliptical cross sectional configurations for the respective studs, with the circular configuration for a given pair of plates and the elliptical configuration for one of these plates and a plate on top of, or at the bottom surface of this pair.

This implementation of the studs allows the longitudinal grooves in the control lever with which the studs coact to be formed with mutually parallel side surfaces. In addition, it allows the studs to be arranged without play in the grooves, enabling very accurate setting of the plates. In spite of this, the implementation of the control lever can be effected with relatively small dimensions, which is advantageous from the flow aspect. Even if there is a certain play between the studs and the control lever, the guide members between the plates ensure that the plates cannot be turned relative each other.

Figure 2:
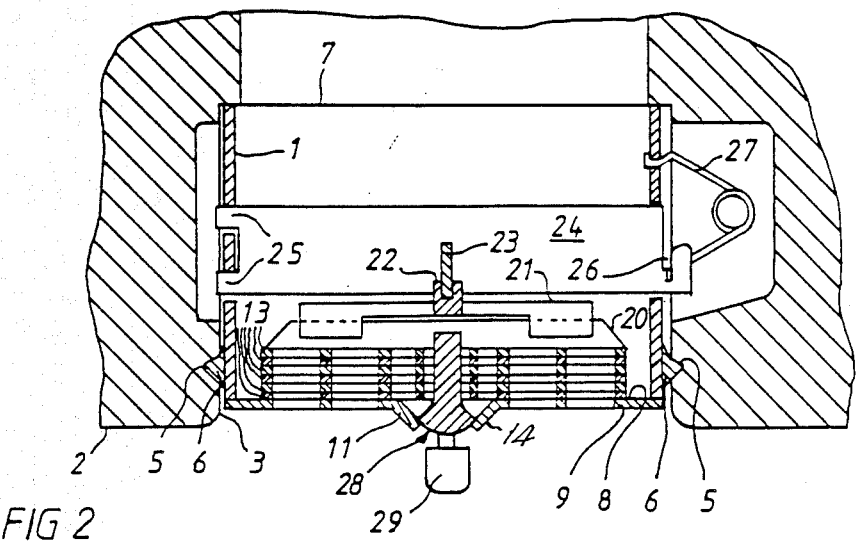
Figure 3:
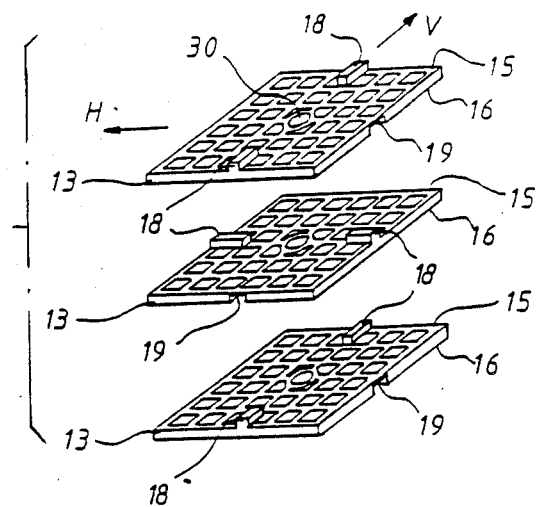
Figure 4:
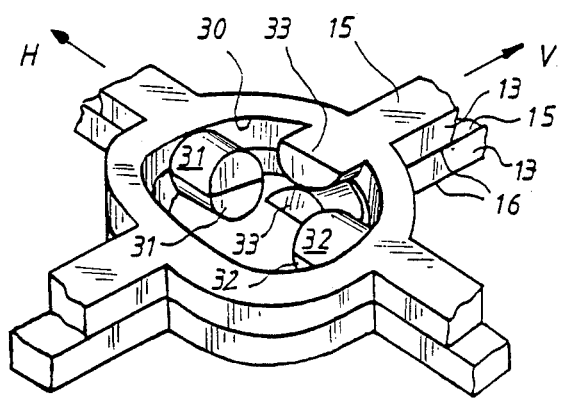
Figure 5:
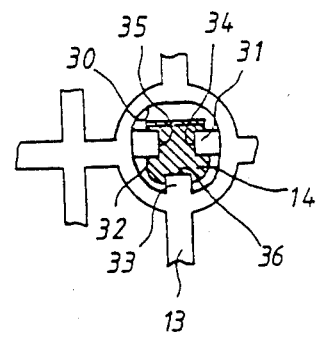

Remaining distinguishing properties of the invention will be apparent from the following description relating to an advantageous embodiment of a discharge nozzle exemplifying the invention in a vehicle ventilation system. The description is made with reference to the accompanying drawings, in which FIG. 1 is a front view of a discharge nozzle, FIG. 2 is a horizontal section A—A of the nozzle according to FIG. 1, FIG. 3 is a principle perspective view of three of the displaceable plates included in the nozzle, FIG. 4 is a partial perspective view to an enlarged scale of a hole in two of the plates, and FIG. 5 is a cross section to an enlarged scale of the control lever and parts of adjacent holes in a plate.

The inventive discharge nozzle includes a housing 1 implemented for attachment to the fascia 2 or the like of a vehicle. Such a fascia 2 is preferably made from a plastics material and is formed with a substantially rectangular opening 3 to which a ventilation duct (unillustrated) included in the vehicle ventilation system is connected at the back of the fascia. Around the front part of the opening 3 the fascia 2 is formed with a plurality of inner recesses 5 for a number of fixing lugs 6 formed on the housing 1 and preferably made from a plastics material which is sufficiently yielding for the lugs to be clamped in the recesses 5 in the opening 3.

Both end surfaces 7 and 8 of the nozzle housing 1 are open for allowing through-flow of ventilation air. To the forward end surface 8 of the housing 1 there is glued an outer distribution plate 9, which is formed with a pattern 10 of square holes so that a plurality of mutually crossing horizontal and vertical bars are formed between the holes, such as to be considered as forming a grid-like overall impression. A partially spherical bearing cup 11 is formed centrally in the outer distribution plate 9.

Inside this outer distribution plate 9, there are arranged six alike inner distribution plates 13 in the housing 2, these plates being formed with the same pattern 10 of holes as the fixed outer distribution plate 9. The inner distribution plates 13 are arranged assemblably, mutually parallel and parallel to the outer distribution plate 9, the distribution plates 9,13 assuming positions substantially at right angles to the longitudinal direction of the housing 1.

The inner distribution plates 13 are laterally displaceable with the limitations given below, and their respective positions relative to the outer fixed distribution plate 9 are controlled by a control lever 14 passing through all the plates 13. Apart from the innermost one, the displaceable plates 13 are formed with guide members 18,19 on both surfaces 15,16, juxtaposed plates 13 coacting with the aid of these guide members. On the other hand, the innermost plate 13 and the fixed plate 9 are solely formed with guide members 15,16 on the surface which are arranged in juxtaposition to the remaining plates 13.

The implementation of the guide members 18,19 is shown in more detail in FIG. 3, which is a principle, perspective view of three of the distribution plates 13 in an unassembled state. With the object of clarifying the guide members 18,19 in FIG. 3, these are shown slightly oversized, and certain parts of the plates 13 have been depicted in a simplified form, also for the purpose of clarity.

The middle one of the plates 13 illustrated in FIG. 3 has its upper surface 15 directed outwards towards the fixed distribution plate 9, and is on this surface provided with two parallel guide blocks 18 extending in a horizontal direction corresponding to the direction denoted by the arrow H. The uppermost of the plates 13 is formed with two guide grooves 19 on its lower surface 16, these grooves being parallel to the guide blocks 18 on the middle plate 13. The guide blocks 18 mate with the guide grooves 19 and prevent the plates 13 from being turned relative each other. The length of the guide blocks 18 is less than the length of the guide grooves 19, however, and the two plates 13 may therefore be displaced mutually parallel in the horizontal direction H.

In a corresponding manner the middle plate 13 is provided with guide grooves 19 on its lower surface 16, these grooves coacting with guide blocks 18 on the upper surface 15 of the lower plate 13. These guide blocks 18 and the guide grooves 19 are oriented in a vertical direction, however, corresponding to the direction denoted by the arrow V. The middle and the lower plate 13 are thus prevented from turning relative each other but can be displaced mutually parallel in the vertical direction V.

In an analogous way, guide grooves 19 on the lower surface 16 of the undermost plate 13 coact with guide blocks on an underlying plate not illustrated in FIG. 3, and guide blocks 18 on the upper surface 15 of the uppermost plate 13 coact with guide grooves in an unillustrated overlying plate.

All plates 9,13 are formed in an analogous way, except for the outer plate 9, which is solely formed with guide grooves 19 on its inward surface 16, and the innermost plate 13 which is solely formed with guide blocks 18 on its surface 15 facing outwards. For the remaining plates 13 the guide blocks 18 are arranged on one surface 15 extend in a direction at right angles to the direction of the guide grooves 19 on the other surface 16 of the plate 13. This results in that two juxtaposed plates 13 can be displaced parallel relative each other in one direction, while in a direction at right angles the same two plates 13 cannot be displaced relative each other. On the other hand, the two plates 13 can together as a unit be displaced relative the plates 9,13 arranged on either side of these two plates 13. All plates 13 are thus enabled to be displaced in pairs in all directions in this way.

The innermost of the inner distribution plates 13, as illustrated in FIG. 2, is formed on its inward surface with a horizontal ridge 20, which is adapted for coaction with a guide cross 21,22. With this in mind, the guide cross 21,22 includes a horizontal arm 21 with a horizontal guide groove in which the ridge 20 fits, thus providing displaceable mounting for the plates 13. The guide cross 21,22 also includes a vertical arm 22 with a vertical groove for a slidably fitting vertical ridge 23 integral with a pressure plate 24. This pressure plate is horizontally arranged in the housing 1 and is formed at one end with two tongues 25 fitting into two corresponding holes in the housing 1. The other end of the pressure plate 24 fits with play into a corresponding recess in the housing 1. At this end the pressure plate is formed with a groove 26 accommodating one end of a helical spring 27, the other end of which is fastened in the housing 1. The spring 27 urges the pressure plate 24 outwards, which in turn urges, via the guide cross 21,22, the distribution plates 13 outwards into mutual engagement.

Setting of the desired flow direction for ventilation air through the fascia outlet is carried out with the control lever 14. As previously mentioned, this is mounted in the bearing cup 11 in the outer fixed distribution plate 9. The control lever 14 is formed for this purpose with a part-spherical bearing surface 28, from which a shank projects outwards through an opening in the bearing cup 11 and is provided with a knob 29. Inwardly the control lever 14 is formed as a homogeneous rod extending through a hole 30 formed in each plate 13, the configuration of the hole being shown in detail in FIGS. 4 and 5. On each plate 13 the hole 30 is formed with three guide studs 31,32,33, extending inwards towards the control lever 14. The studs 31,32 and 33 are arranged at 90° to each other such that two studs 31,32 are diametrically opposed. Both these studs 31,32 are semi-circular in cross section. The third, intermediate stud 33 has a half-elliptical cross sectional configuration, the major axis of which is arranged in a plane which also includes one surface 15,16 of the plate 13. The other surface 15,16 of the plate is arranged in a place which also includes a diameter of the studs 31,32, which have semi-circular cross sectional configuration.

For two adjacent plates 13 the semi-circular studs 31,32 on respective plates are complementary and thus make up a completely circular cross sectional configuration, as illustrated in FIG. 4. In a corresponding way the semi-elliptical studs 33 on two adjacent plates are complemental and thus form a completely elliptical cross sectional configuration. In FIG. 4 the middle stud 33 of the upper plate 13 thus coacts with the middle stud on an unillustrated plate lying on top of the one illustrated. In the same way the middle stud 33 of the lower plate 13 coacts with a middle stud of an unillustrated plate lying against the bottom plate illustrated in FIG. 4. The control lever 14 passing through the holes 30 is not illustrated in FIG. 4.

The studs 31-33 of all the plates 13 fit into longitudinal grooves 34,35,36 in the control lever 14, as illustrated in FIG. 5. Two of the grooves 34,35 are arranged on opposing side surfaces of the control lever 14 and are formed with a groove width which is substantially the same as the diameter of the semicircular studs 31,32, which thus fit without play in the grooves 34,35.

In a similar way the semi-elliptical studs 33 fit the third groove 36, which is formed with a groove width which is substantially just as great as the length of the major axis of the ellipse. These studs 33 thus also fit the groove 36 without play. It is also illustrated in FIG. 5 how the section line A—A according to FIG. 1 extends in the vicinity of the control lever 14.

In order to set the desired flow direction for ventilation air through the discharge nozzle, the control lever 14 is caused to turn about its mounting in the bearing cup 11 in the outer distribution plate 9.

During such a movement the inner distribution plates 13 are caused to move in parallel so that the patterns 10 of holes in the distribution plates 9,13 form deflecting ventilation ducts which can lead the ventilation air in a direction substantially coinciding with the longitudinal direction to which the control lever 14 is set.

When displacing the control lever 14 in a vertical direction, it is turned about the horizontal studs 31,32, which have a semi-circular cross sectional configuration. However, the guide members 18,19 between the plates 13, which have studs 31,32 completely forming circles in cross section, are oriented such that the plates 13 cannot be mutually displaced in a vertical direction. This results in that these plates 13 can be displaced vertically solely in pairs.

In the turning movement of the control lever 14, relative turning takes place between the studs 31,32 of the plates and the control lever 14. Since the grooves 34,35 of the control lever 14 have the same width as the diameters of the studs 31,32, there is obtained a setting which is equally as accurate independent of the set position of the control lever 14.

When the control lever 14 is displaced in the horizontal direction, it is turned in a corresponding way about the studs 33 which have semi-elliptical cross sectional configuration. In this case, the guide members 18, 19 between the plates 13, which have studs 33 complementary forming completely elliptical cross sectional configurations, are oriented such that the plates 13 cannot be mutually displaced in a horizontal direction. This results in that these plates 13 can only be displaced horizontally in pairs. The plates 13 coacting in pairs in this way are thus not the same as the plates 13 coacting in pairs for a vertical displacement of the control lever 14.

The studs 33 engaging in the groove 36 on the control lever 14 coact in pairs analogously as with a stud with a completely elliptical cross sectional configuration. For a turning movement of the control lever 14 relative the studs 33 the width of the coacting studs 33 in the groove 36 will be substantially constant and equal to that of the groove 36, irrespective of the rotational position of the control lever 14 relative the studs 33. This results in that the setting of the plates 13 can take place with great accuracy.

The mentioned cross sectional configuration of the studs 31-33 thus result in that the control lever can simultaneously be displaced to a maximum both in a vertical and horizontal direction, and thereby enable universal setting of the discharge nozzle with great accuracy.

The grooves 34-36 in the control lever 14 extend along the axial length of the lever 14 inwards along its entire length, but outwards only as far as the outermost of the displaceable plates 13. This results in that the studs 31-33 in this plate also engage against a transverse edge (not illustrated) in the respective groove 31-33. The lever 14 is thus positioned axially inwardly by these edges in the grooves 31-33 and outwardly by the previously mentioned bearing cup 11.

Simultaneously as the control lever 14 is turned horizontally and/or vertically the guide cross 21,22 slides relative to the horizontal ridge 20 and the vertical ridge 23, respectively. It is thus ensured that the distribution plates 13 are urged towards each other in all setting positions. On the other hand, transverse forces parallel to the plates 13 cannot be transmitted from the spring or the pressure plate 24, which ensures that the plates 13 are not uncontrollably displaced in this way.

The invention is not restricted to the exemplified embodiment, but can be modified and applied in alternative embodiments within the scope of the following claims.

For example, the implementation of the guide members can be varied in a plurality of different ways, as well as their orientation in relation to the plates. In the described example, it has been stated how the plates coact in pairs. In an alternative embodiment it is possible to adapt the plates so that coaction can also take place between three or more plates. The embodiment of the control lever and coacting studs can also be varied. The invention is thus not restricted to the described example.

I claim:

1. A nozzle for discharging ventilation air from a ventilation system, comprising:
   (A) a housing with a through-flow duct for conducting the ventilation air through said housing;
   (B) a plurality of relatively displaceable plates across said duct, said plates being disposed over one another and being oriented generally parallel, said plates each having a hole therethrough for air flow, said holes being arranged over said plates to that said holes in said plates coact to form a ventilation duct for conducting ventilation air through said through-flow duct of said housing, said plates being displaceable transverse to said through-flow duct to move their said holes to change the flow direction of the ventilation air;
   (C) guide means for preventing adjacent said plates from turning with respect to each other and for permitting said adjacent plates to shift in a direction transverse to said through-flow duct with respect to each other, said guide means including guide members defined on each of said plates, said guide members being shaped and placed so that said guide members of adjacent said plates cooperate to prevent said turning and to permit said shifting; and
   (D) means engaging said plates for displacing them with respect to each other for redirecting air flow.

2. The nozzle of claim 1, wherein said guide means includes means for causing a pair of adjacent said plates to be displaceable in one respective direction each with respect to each other and for causing a second pair of said plates to be displaceable in a second different respective direction with respect to each other.

3. The nozzle of claim 2, wherein one said plate has said guide members on opposite sides thereof so that said one plate is one of each of said first and second pairs of plates.

4. The nozzle of claim 2, wherein said engaging means comprises a lever passing through said plates for displacing said displaceable plated for changing the direction of flow of the ventilation air.

5. The nozzle of claim 2, wherein one of said plates is a fixed plate rigidly connected to said housing and other said plates are displaceable with respect to said fixed plate.

6. The nozzle of claim 5, wherein said plates are parallel and juxtaposed one closely above the next adjacent one.

7. The nozzle of claim 1, wherein said plates have opposite surfaces; said guide members comprising:
   guide blocks on one said surface of one said plate;
   cooperatingly shaped and placed guide grooves in an adjacent said surface of another said plate for receiving said guide blocks, said blocks and said grooves being shaped to enable said plates to displace relative to each other along one direction.

8. The nozzle of claim 7, wherein said guide blocks on said one surface have a direction of extension and the respective cooperating said guide grooves on the adjacent said plate surface extend parallel to said direction of extension.

9. The nozzle of claim 8, wherein there are said guide members on the opposite said surfaces of each said plate;
   said guide members at one said surface of a said plate extend at right angles to said guide members at the opposite said surface of that said plate.

10. The nozzle of claim 8, wherein there are said guide members on the opposite said surfaces of each said plate;
    said guide members at one said surface of a said plate extend in a different direction from said guide members at the opposite said surface of that said plate.

11. The nozzle of claim 9, wherein said guide members are oriented such that two adjacent said plates are displaceable with respect to each other while remaining parallel to each other.

12. The nozzle of claim 8, wherein said guide members are oriented such that two adjacent said plates are displaceable with respect to each other while remaining parallel to each other.

13. The nozzle of claim 2, wherein said guide members are oriented such that two adjacent said plates are displaceable with respect to each other while remaining parallel to each other.

14. The nozzle of claim 4, wherein each of said plates includes a lever hole therethrough and said control lever extends through said lever holes; said control lever and said lever holes are respectively so shaped that lateral motion of said lever correspondingly moves said plates which are engaged by said lever, in the manner permitted by said guide members.

15. The nozzle of claim 14, further comprising longitudinal grooves in and extending along said lever and each of said lever holes in a said plate being shaped and bordered to define a plurality of studs which are directed inwardly in different respective directions and are engaged within respective said longitudinal grooves.

16. The nozzle of claim 15, wherein each said lever hole has three said studs.

17. The nozzle of claim 16, wherein each said stud of each said lever hole is perpendicular to the adjacent said stud of that said lever hole.

18. The nozzle of claim 17, wherein two of said studs are mutually opposed and those said studs have the same cross-sections.

19. The nozzle of claim 18, wherein said two studs have a semicircular cross-section, and the third said stud has a cross-section of half an ellipse.

20. The nozzle of claim 19, wherein:
    a diameter of said cross-section of said two studs is located in a plane which includes one said surface of the respective said plate; and the major axis of said cross-section of the third said stud is located in a plane which includes the other said surface of said plate.

21. The nozzle of claim 20, wherein:
the two said studs of first and second adjacent said plates are oriented so that together they form a completely circular cross-section; and
the third said studs of said first plate and of a third plate which is adjacent to said first plate are oriented so that they together form a completely elliptical cross-section.

22. The nozzle of claim 1, wherein said nozzle is adapted for use within a vehicle.

23. The nozzle of claim 5, further comprising urging means for urging said displaceable plates toward said fixed plate without affecting the said displaceability of said displaceable plates.

24. The nozzle of claim 23, wherein said urging means comprises:
a first ridge on one of said displaceable plates;
a guide cross, said guide cross comprising a first groove for slidably receiving said ridge, and a second groove which is fixed with respect to and perpendicular to said first groove;
a second ridge slidably received within said second groove; and a pressure plate arrangement for applying pressure to said second ridge.

25. The nozzle of claim 24, wherein said pressure plate arrangement comprises:
a pressure plate fixed to said second ridge;
a spring for pressing said pressure plate toward said displaceable plates; and
tongues connecting said pressure plate to said housing.

* * * * *